United States Patent
Robinson et al.

(10) Patent No.: US 6,210,281 B1
(45) Date of Patent: Apr. 3, 2001

(54) PHASE-ADJUSTMENT MECHANISM

(75) Inventors: Glenn Robinson, Alpharetta; Will L. Culpepper, Covington, both of GA (US)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/175,799

(22) Filed: Oct. 21, 1998

(51) Int. Cl.[7] ............... F16D 3/10; F16H 35/06
(52) U.S. Cl. ............... 464/160; 474/900; 74/395
(58) Field of Search ............... 474/108, 900, 474/117; 464/160, 161, 169, 23; 74/395, 333; 123/90.15, 90.17, 90.31, 503, 501; 53/393, 252; 198/473.1, 803.11; 101/110, 91

(56) References Cited

U.S. PATENT DOCUMENTS

| | | | |
|---|---|---|---|
| 465,868 | * 12/1891 | Maclean | 464/160 |
| 2,736,421 | 2/1956 | Bell | 198/803.11 |
| 3,857,474 | 12/1974 | Hutson | 198/626.5 |
| 4,302,985 | * 12/1981 | Natkin | 474/900 X |
| 4,500,053 | * 2/1985 | Brand | 464/161 X |
| 4,598,639 | * 7/1986 | Sette | 101/110 |
| 4,718,540 | 1/1988 | Greenwell | 198/620 |
| 4,990,122 | * 2/1991 | Grimm | 464/160 X |
| 5,033,323 | * 7/1991 | Janson | 464/160 X |
| 5,145,053 | 9/1992 | Krieger et al. | 198/626.5 |
| 5,238,101 | 8/1993 | Ota et al. | 198/626.5 |
| 5,241,806 | 9/1993 | Ziegler et al. | 53/566 |
| 5,282,530 | 2/1994 | Neri | 198/473.1 |
| 5,328,021 | 7/1994 | Calvert et al. | 198/803.11 |
| 5,339,599 | 8/1994 | Risnes | 53/252 |
| 5,394,975 | 3/1995 | Bernhard | 198/473.1 |
| 5,426,992 | * 6/1995 | Morii et al. | 474/900 X |
| 5,544,738 | 8/1996 | Klopfenstein | 198/626.5 |
| 5,560,473 | 10/1996 | Ivancso, Jr. et al. | 198/803.11 |

* cited by examiner

Primary Examiner—Mary Ann Green
Assistant Examiner—Marcus Charles
(74) Attorney, Agent, or Firm—Michael V. Drew

(57) ABSTRACT

A pair of concentrically mounted drive shafts are rotatable with respect to one another. Each drive shaft engages and drives at least one endless chain upon which lugs are mountable. A driven power shaft directly drives one of the drive shafts. The other drive shaft has a coaxially-mounted gear wheel that intermeshes with a pinion wheel that is rotatable and is interconnected with the driven power shaft such that when the pinion wheel is inhibited from rotating power is delivered from the driven power shaft through the locked pinion gear to the gear wheel and drive shaft affixed thereto.

2 Claims, 3 Drawing Sheets

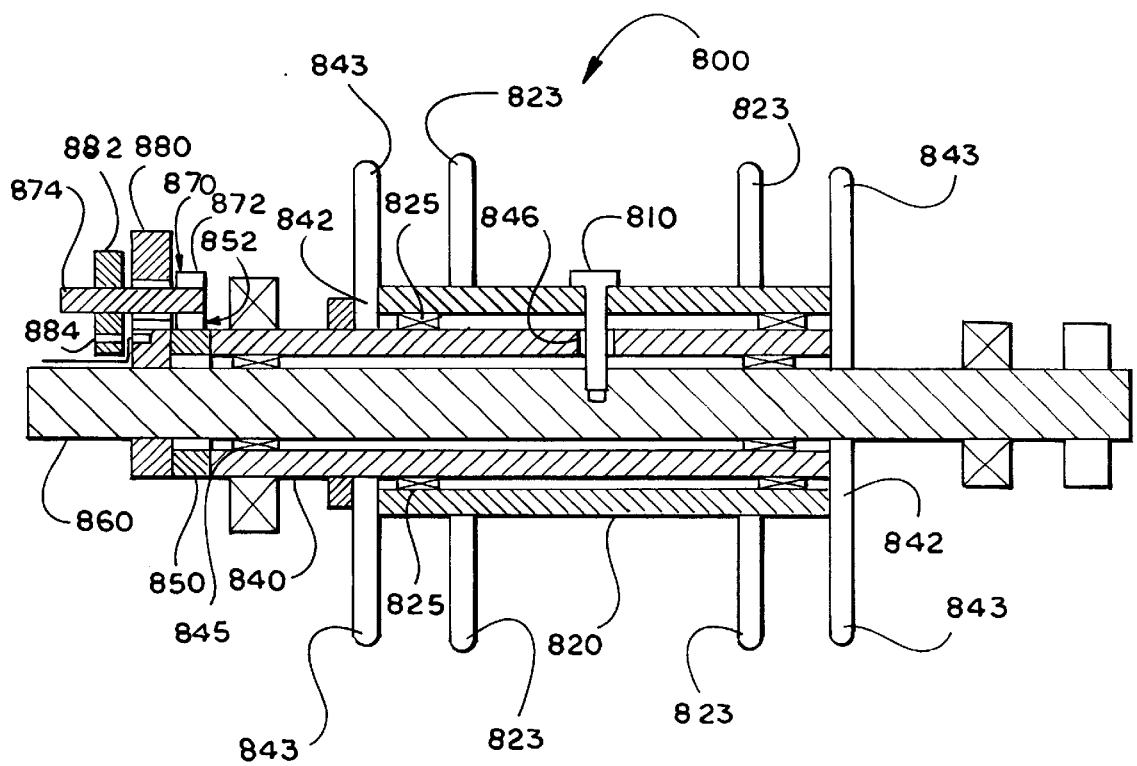
Fig_3
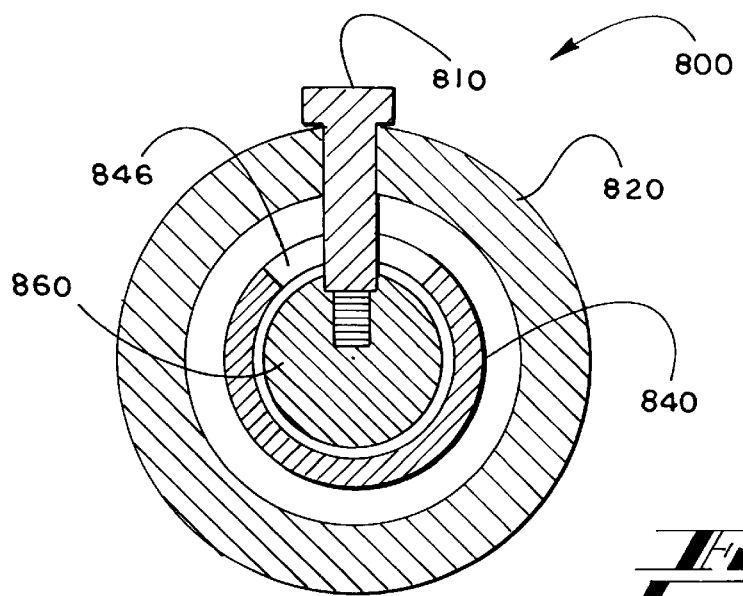
Fig_4

PHASE-ADJUSTMENT MECHANISM

BACKGROUND OF THE INVENTION

Technical Field

The invention relates to continuous-motion packaging machines, and, more particularly, to a phase-adjustment mechanism for modifying the phase relationship between carton lugs in such a machine.

Continuous-motion cartoning machines are useful for packaging multiple articles such as beverage cans in cartons or other packaging components. An example of a continuous-motion cartoning machine is shown in U.S. Pat. No. 5,241,806 to Ziegler et al.

In cartoning machines (also known as packaging machines) endless chains are often used to transport lugs which in turn translate cartons or other objects along the length of the machine. The distance between lugs is generally referred to as "phase" or "pitch." It is often desirable to use a packaging machine to package cartons of different sizes at different times. The phase, or pitch, of the carton transport mechanism must be modified to accommodate cartons of a different size. It is important that phase/pitch modification not be too difficult or time consuming. Thus, it can be appreciated that it would be useful to have a means for rapidly and easily adjusting the phase/pitch of a carton transport.

Various phase-adjustment methods and structures are disclosed in U.S. Pat. No. 5,560,473 to Ivansco, Jr. et al., U.S. Pat. No. 5,544,738 to Klopfenstein, U.S. Pat. No. 5,394,975 to Bernhard, U.S. Pat. No. 5,339,599 to Risnes, U.S. Pat. No. 5,328,021 to Calvert et al., U.S. Pat. No. 5,282,530 to Neri, U.S. Pat. No. 5,241,806 to Ziegler et al., U.S. Pat. No. 5,238,101 to Ota et al., U.S. Pat. No. 5,145,053 to Krieger et al., U.S. Pat. No. 4,718,540 to Greenwell et al., U.S. Pat. No. 3,857,474 to Hutson et al. and U.S. Pat. No. 2,736,421 to Bell.

BRIEF SUMMARY OF THE INVENTION

A phase-adjustment mechanism in accordance with a preferred embodiment of the invention includes a pair of concentrically mounted drive shafts which are rotatable with respect to one another. Each drive shaft engages and drives at least one endless chain upon which lugs are mountable. A driven power shaft directly drives one of the drive shafts. The other drive shaft has a coaxially-mounted gear wheel that intermeshes with a pinion wheel that is rotatable and is interconnected with the driven power shaft such that when the pinion wheel is inhibited from rotating power is delivered from the driven power shaft through the locked pinion gear to the gear wheel and drive shaft affixed thereto.

Other advantages and objects of the present invention will be apparent from the following description, the accompanying drawings, and the appended claims.

BRIEF DESCRIPTION OF THE DRAWINGS

FIG. 3 is a longitudinal cross-sectional illustration of the phase-adjustment mechanism of FIG. 2.

FIG. 4 is a cross-axial sectional illustration of the phase-adjustment mechanism of FIG. 2.

DETAILED DESCRIPTION OF A PREFERRED EMBODIMENT

Figure 1:
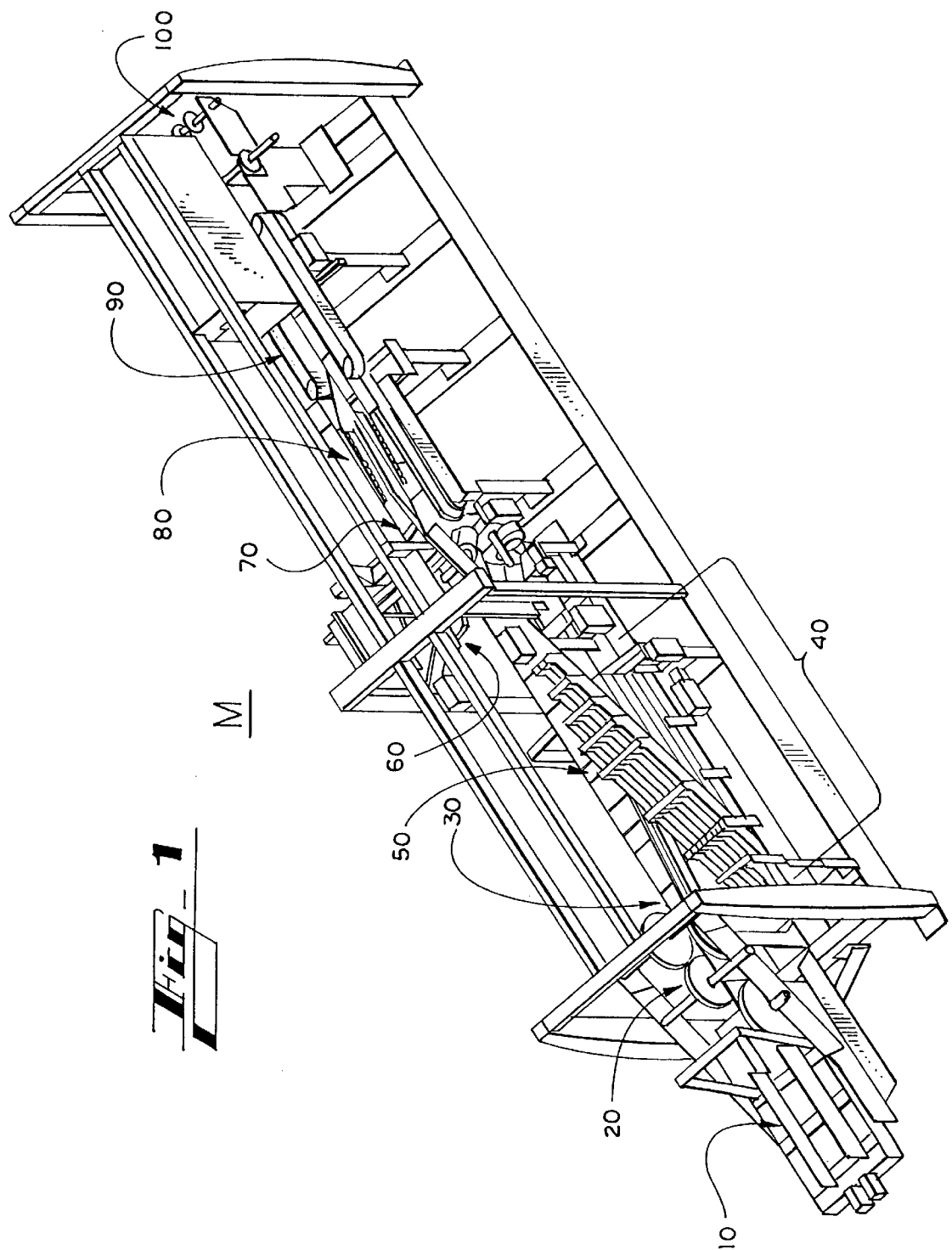
FIG. 1 is an isometric illustration of a continuous-motion cartoning machine suitable for incorporation therein of a phase-adjustment mechanism in accordance with a preferred embodiment of the invention.

Throughout the drawings the same reference numerals are used to denote the same or like features of the invention.

Referring first to FIG. 1, therein is illustrated the context of a continuous-motion cartoning machine M, suitable for incorporating therein a phase-adjustment mechanism in accordance with a preferred embodiment of the invention. In the machine, the carton hopper 10 receives collapsed cartons C stacked in substantially upright condition as shown. Cartons C are withdrawn from the carton hopper 10 by the adjustable carton feeder 20 and then deposited in substantially erect condition at the beginning of the carton conveyor 30. As cartons are continuously engaged and translated through the machine M, articles, such as beverage cans, to be packaged in the cartons C are also translated through the machine in synchronous motion with the cartons. An article conveyor 40 and article lane arrangement 50 form an article transport that urges the articles into the cartons C. Article-engaging wheels 60 complete the process of placement of the articles into cartons C. Side-flap folding wheels 70 (partially obstructed in FIG. 1) engage and inwardly fold the side flaps of cartons having side flaps. Glue is applied to the cartons C at a gluing station 80. At a sealing station 90, end flaps of the cartons C are pressed and held into contact with glue that has been previously applied. Packaged, sealed cartons are ejected from the machine at the ejection station 100.

Figure 2:
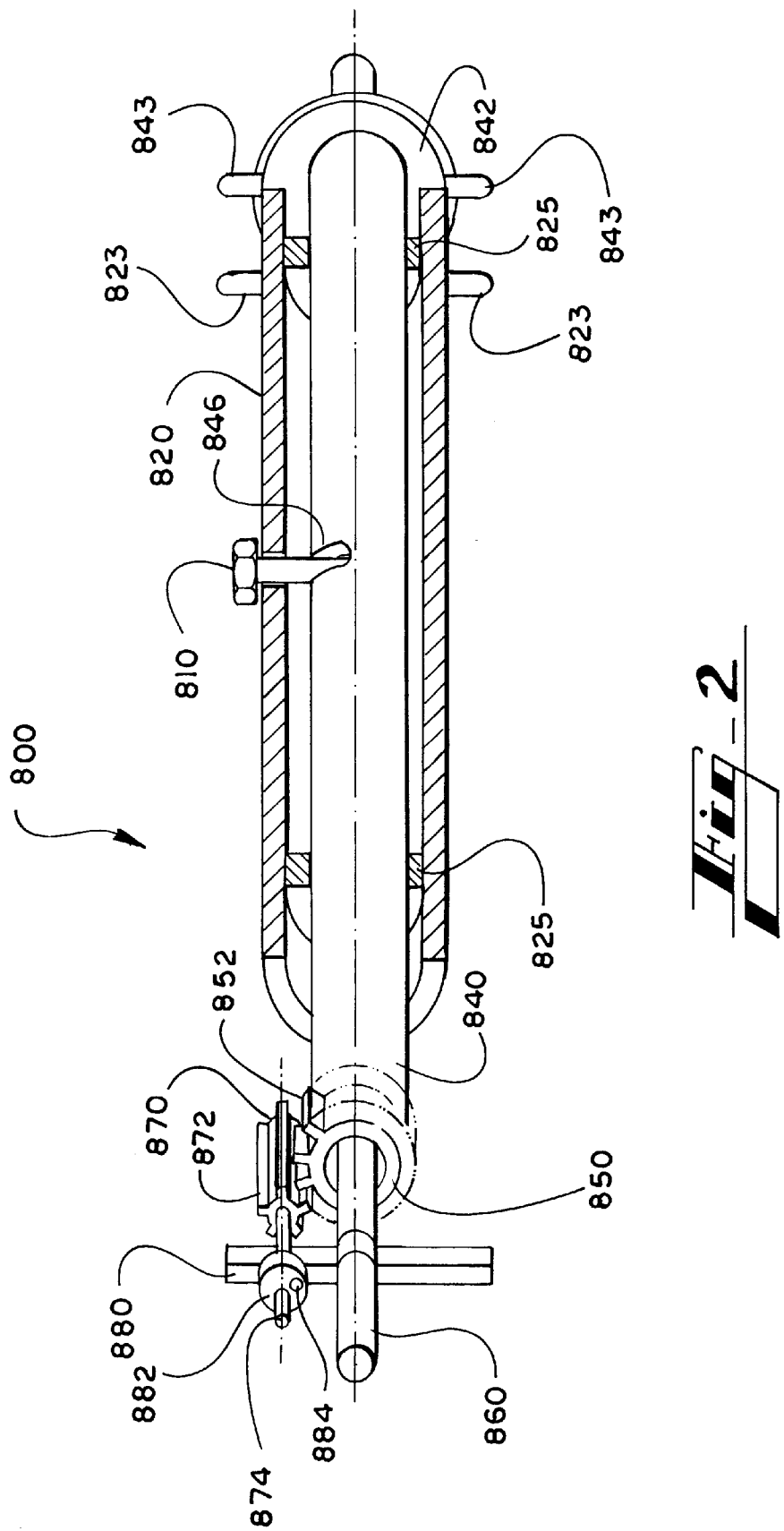
FIG. 2 is a partially cut-away isometric illustration of a phase-adjustment mechanism in accordance with a preferred embodiment of the invention.

Referring now to FIG. 2, therein is shown in partial cut-away view, an isometric illustration of a phase-adjustment mechanism 800 in accordance with a preformed embodiment of the invention. A drive shaft 820 (for convenience of reference referred to as a "first" drive shaft 820) has structure 823 for engaging at least one endless chain. The structure 823 in the preferred embodiment illustrated is a sprocket for an endless chain. Although each of the drive shafts 820,840 may drive more than one endless chain, in FIG. 2 structure 823, 842, 843 for engaging only one endless chain per respective drive shaft 820, 840 is shown for convenience of clarity. In FIG. 3, structure for driving two endless chains per drive shaft is shown.

Referring now to FIG. 2 and FIG. 3 simultaneously, a second drive shaft 840 is concentrically and rotatably disposed within the first drive shaft 820. Typical bushings or bearings 825 for concentrically mounted shafts are shown. The second drive shaft 840 has structure 842, 843 for engaging at least one endless chain. As previously noted, only on structure 842 in the form of a drive sprocket with radially extending teeth 843 is shown in FIG. 2 for convenience of clarity while structure 842 for engaging a pair of endless chains is shown in FIG. 3. A gear wheel 850 having gear teeth 852 for engagement with a pinion (described below) is coaxially affixed to the second drive shaft 820.

A driven power shaft 860 is concentrically and rotatably mounted within the second drive shaft 840. Typical bushings or bearings 845 are disposed between the driven power shaft 860 and the second drive shaft 840. A pinion gear 870 having pinion gear teeth 872 is rotatably intermeshed with the gear wheel 850 and gear teeth 852 of the second drive shaft. The shaft 874 of the pinion gear 870 is supported by and rotatable within a connecting member 880 which is affixed to the driven power shaft 860. A lock for the pinion gear 870 is formed by a lock member 882 which is affixed to the pinion shaft 874 and which has an aperture 884 therethrough for receiving a pin (pin not shown). The pin is inserted through the aperture 884 of the lock member 882 and a second locking aperture 886 (shown in FIG. 3 only) to inhibit rotation of the pinion gear 870. Other methods of inhibiting rotational motion of a structure are contemplated by the invention.

Referring now also to FIG. 4, the first drive shaft 820 is interconnected to the driven power 860 shaft by means of a fastener 810 which passes through a radial slot 846 in the second drive shaft 840. The driven power shaft 860 is driven or powered by known driving or powering means such as a motor mechanically connected to the power shaft 860.

In operation, the first drive shaft 820 is always turned as the power shaft 860 turns because of the interconnection between the two by the connecting member 820. Although other means may be used to interconnect the power shaft 860 and first drive shaft 820, the use of the connecting member 810 passing through the first drive shaft 820, then through the radial slot 846 of the second drive shaft 840 and ultimately screwed into the power shaft 860 is simple. When the pinion gear 870 is prevented from rotating as described above, the pinion gear 870 and the gear wheel 850 do not rotate with respect to one another but instead serve as a mechanical link for transmission of power from the power shaft 860 through the pinion connecting member 880 through the pinion gear 870 to the gear wheel 850 and ultimately to the second drive shaft 840. When the pinion gear 870 is so inhibited from rotation the first drive shaft 820 and second drive shaft 840 move together with the power shaft 860. In turn, the endless chains that are engaged by each drive shaft 820, 840 through the respective sprocket structures 823, 842, 843 travel in synchronous motion. The phase, or pitch, of lugs attached to the chains is constant.

The phase/pitch is adjusted by unlocking the pinion gear 870 (by removal of the pin from the aperture 886) so that the pinion gear 870 rotates freely, particularly with respect to the gear wheel 850. When the pinion gear 870 is allowed to rotate freely no power is transmitted to the second drive shaft 840 by the power shaft 860. As previously mentioned, the first drive shaft 820 always turns in conjunction with the power shaft 860 because of the interconnected previously described. Thus, the phase, or pitch, is adjusted by turning the power shaft 860 (which, in turn, turns the first drive shaft) clockwise or counter-clockwise a desired amount to achieve the desired spacing between lugs or other structures mounted upon the endless chains which are in turn engaged by the respective first 820 and second 840 drive shafts. Thus, asynchrounous movement of the two drive shafts 820, 840 is limited to the angle subtended by the radial slot 846.

Modifications may be made in the foregoing without departing from the scope and spirit of the claimed invention.

What is claimed is:

1. A phase-adjustment mechanism comprising:

a first drive shaft having first structure for engaging at least one first endless chain, a driven power shaft in powering engagement with said first drive shaft, a second drive shaft concentrically mounted within and rotatable with respect to said first drive shaft, having second structure for engaging at least one second endless chain and having a first gear wheel coaxially mounted thereupon;

a pinion gear interconnected with said drive shaft and rotatably intermeshed with said first gear; and a lock for selectively inhibiting rotation of said pinion gear;

whereby when said pinion gear is inhibited from rotating said second drive shaft is driven by said driven power shaft and when said pinion gear is not inhibited from rotating said second drive shaft is not driven by said driven power shaft.

2. The phase-asjustment mechanism according to claim 1, wherein said driven power shaft is concentrically mounted within and rotatable with respect to said second drive shaft and wherein said driven power shaft is in engagement with said first drive shaft by means of a member extending through said first drive shaft, through a radial slot in said second drive shaft subtending a predetermined angle and interconnected with said driven power shaft whereby asynchronous movement of said first drive shaft and said second drive shaft is limited by said radial slot.

* * * * *